United States Patent [19]

Hirano et al.

[11] Patent Number: 5,089,185
[45] Date of Patent: Feb. 18, 1992

[54] OPTICAL MOLDING METHOD

[75] Inventors: Yoshinao Hirano; Katsumi Sato, both of Chiba; Junji Shirai, Okayama; Shigeru Nagamori, Chiba, all of Japan

[73] Assignee: Mitsui Engineering and Shipbuilding Co., Ltd., Tokyo, Japan

[21] Appl. No.: 451,999

[22] Filed: Dec. 18, 1989

[30] Foreign Application Priority Data

Jul. 7, 1989 [JP] Japan .................. 1-176481

[51] Int. Cl.$^5$ .............................................. B29C 35/08
[52] U.S. Cl. .................. 264/22; 156/272.8; 156/273.5; 156/275.5; 156/307.1; 250/492.1; 264/308; 264/331.19; 264/331.21; 427/53.1; 427/54.1
[58] Field of Search ................ 264/1.3, 1.4, 22, 236, 264/255, 308, 331.18, 331.19, 331.21; 156/242, 272.8, 273.3, 273.5, 275.5, 307.1; 250/432 R, 492.1; 364/468, 474.05, 474.08, 474.24, 520, 521, 522, 523; 427/43.1, 53.1, 54.1, 407.1; 430/281, 286

[56] References Cited

U.S. PATENT DOCUMENTS 4,212,900  7/1980  Serlin ........................... 427/53.1
4,575,330  3/1986  Hull ............................. 425/174.4

FOREIGN PATENT DOCUMENTS 171069    2/1986  European Pat. Off. .
319175    6/1989  European Pat. Off. .
60-247515 12/1985 Japan ........................... 264/22
61-116322  6/1986 Japan ........................... 425/174.4
62-35966   2/1987 Japan .
62-101408  5/1987 Japan ........................... 264/22
WO89/09687 10/1989 PCT Int'l Appl. .

Primary Examiner—Leo B. Tentoni
Attorney, Agent, or Firm—Kanesaka and Takeuchi

[57] ABSTRACT

An optical molding method includes the step of radiating a light flux onto a photocurable fluid substance while moving the light flux in such a manner as to draw a section of a target object so as to cure the irradiated portion. A plurality of light fluxes having different diameters is used in such a manner that only a light flux having a large diameter, or both a light flux having a large diameter and a light flux having a small diameter are used for a section having a thickness larger than the diameter of the light flux having a large diameter, while only a light flux having a small diameter is used for a section having a thickness smaller than the diameter of the light flux having a large diameter.

13 Claims, 4 Drawing Sheets

OPTICAL MOLDING METHOD

FIELD OF THE INVENTION AND RELATED ART STATEMENT

The present invention relates to an optical molding method for producing a cured body with a desired configuration having a thick section and, more particularly, to an optical molding method which enhances the molding speed and accuracy when molding a cured body having a thick section.

Optical molding methods for optically producing a target object by repeating the process of radiating a light flux on a photocurable fluid substance such as a photocurable resin so as to cure the irradiated portion and extend the cured portion continuously in the horizontal direction, supplying a photocurable fluid substance on the upper side of the cured portion and radiating a light flux on the resin so as to also extend the cured portion continuously in the vertical direction are known as disclosed in, for example, Japanese Patent Laid-Open Nos. 247515/1985, 35966/1987 and 10140/1987.

An optical molding method for producing a target object by repeating the process of radiating light through a molding mask having slits which corresponds to a section of a target object so as to cure the irradiated portion, supplying an uncured photocurable fluid substance on the upper side of the cured portion, replacing the molding mask for a mask provided with slits and having a configuration which corresponds to a section vertically adjacent to the section already cured, and radiating light again is also known (e.g., Japanese Application Laid-Open No. 35966/1987).

A scanning method of reciprocating a light flux in the horizontal direction continuously and densely in order to form a cured object having a thick section is known (shown in FIG. 2 in Japanese Application Laid-Open No. 35966/1987).

When a cured object having a thick section is formed by the scanning of a light flux, since the area of a light flux scanning range is large, a long molding time is required. Although the molding time is shortened by increasing the scanning speed, since the speedup of the scanning speed is attended with a rapid stop of radiation of a light flux and a change in the direction of radiation, there is a large possibility of lowering the surface accuracy, especially, in the case of producing a cured object having a complicated configuration On the other hand, if a multiplicity of light fluxes, each having a small diameter are gathered and emitted, it is possible to cure a large region at one scanning operation. In this case, however, a multiplicity of light sources for the light fluxes having small diameters are required, resulting in the rise in the equipment cost.

A method of producing an object having a thick section by reciprocating a light flux in the horizontal direction continuously and densely has the same problems. In addition, this method is disadvantageous in that the light flux scanning mechanism is complicated and the control thereof is difficult.

A method using a mask must use a multiplicity of masks and takes a long time for producing masks.

OBJECT AND SUMMARY OF THE INVENTION

Accordingly, it is an object of the present invention to eliminate the above-described problems in the prior art and to provide an optical molding apparatus which is capable of producing even a large object easily and in a short time and finishing the surface of the object finely and at high accuracy.

It is another object of the present invention to provide an optical molding apparatus which is capable of reducing the cost of the apparatus and the cost of expendable supplies so as to produce an object with efficiency in accordance with the required accuracy.

To achieve this aim, the present invention provides an optical molding method including the step of forming a cured layer of a photocurable fluid substance which corresponds to a section of a cured object having a desired configuration by the scanning operation of a light flux, characterized in that a plurality of light fluxes having different diameters are used in such a manner that only a light flux having a large diameter, or both a light flux having a large diameter and a light flux having a small diameter are used for a section having a thickness larger than the diameter of the light flux having a large diameter, while only a light flux having a small diameter is used for a section having a thickness smaller than the diameter of the light flux having a large diameter.

In the present invention, a target object is produced by radiating a light flux, for example, in the following manners:

(a) When any given section of a target object is a thick section, only a light flux having a larger diameter is irradiated to cure the entire part of the section.

(b) When any given section has a complicated configuration, a light flux having a large diameter is first radiated so as to schematically cure the main part, and thereafter the detailed parts and the surface portion of the target object are cured by radiating a light flux having a small diameter.

(c) In the method (b), the detailed portions and the surface portion of a target object are first cured by the radiation of a light flux having a small diameter, and thereafter a light flux having a large diameter is radiated.

(d) A light flux having a small diameter and a light flux having a large diameter are radiated at the same time so as to simultaneously cure the detailed portions, the surface portion and the main part.

(e) A photocurable fluid substance is cured by alternately radiating a light flux having a small diameter and a light flux having a large diameter.

It is also possible to use three or more light fluxes having different diameters. For example, three kinds of light fluxes having small, medium and large diameters may be used so as to radiate the regions corresponding to the respective diameters.

The above and other objects, features and advantages of the present invention will become clear from the following description of the preferred embodiments thereof, taken in conjunction with the accompanying drawings.

DESCRIPTION OF THE PREFERRED EMBODIMENTS

Preferred embodiments of an optical molding method according to the present invention will be explained with reference to the accompanying drawings.

Figure 9:
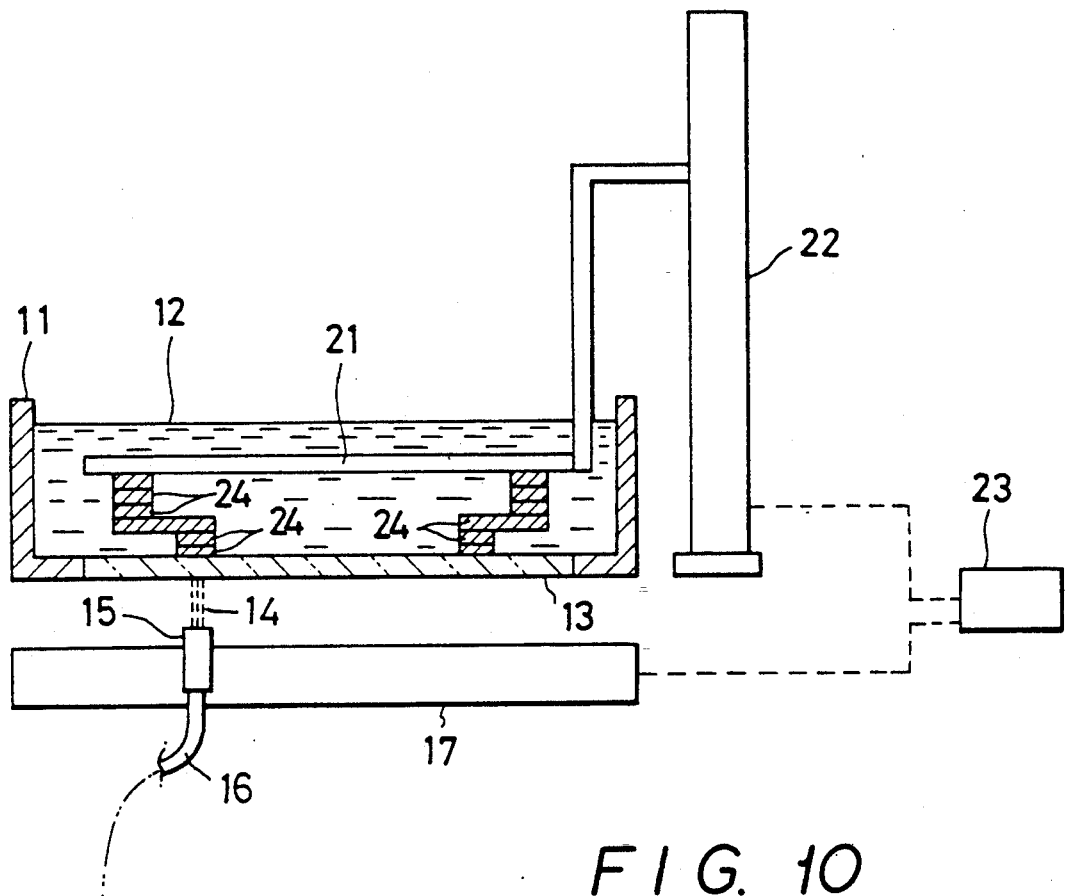
FIG. 9 is a vertical sectional view of an optical molding apparatus.

In FIG. 9, a photocurable resin 12 is accommodated in a container 11. On the bottom surface of the container 11, an aperture 13 made of a light transmitting plate such as a silica glass plate is provided. An optical system (light radiation device) is provided which is composed of a light emitting portion 15 with a built-in lens for radiating a light flux 14 onto the aperture 13, an optical fiber 16, an X-Y table 17 for moving the light emitting portion 15 in the X-Y direction in the horizontal plane, wherein X and Y are two directions orthogonal to each other, and a light source 20.

A base 21 is disposed in the container 11 so as to be lifted by an elevator 22. The X-Y table 17 and the elevator 22 are controlled by a computer 23.

Figure 8:
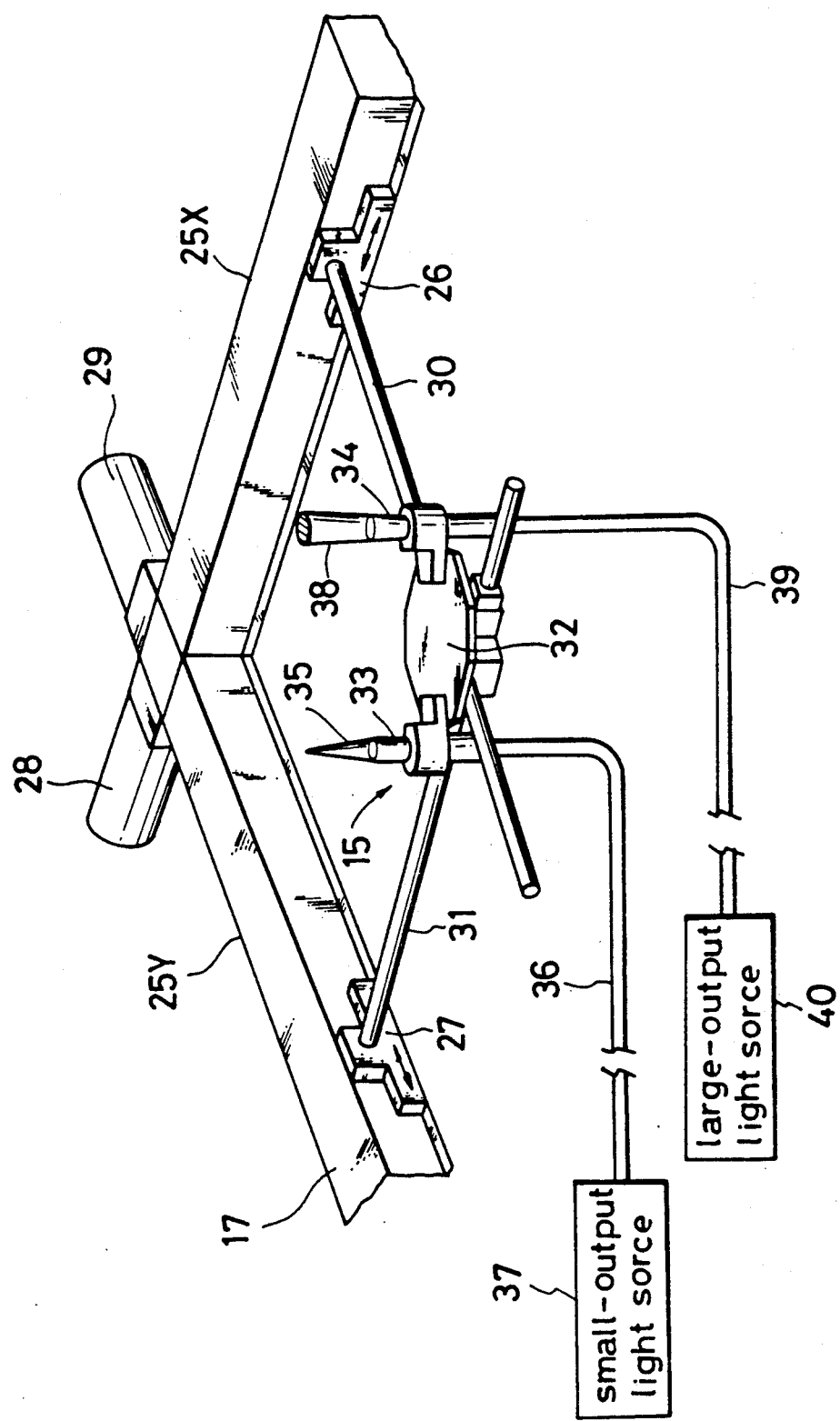
FIG. 8 is a perspective view of the main part of an optical molding apparatus.

FIG. 8 is a perspective view of a structure of the light emitting portion, the X-Y table 17, etc. in the case of preparing light fluxes having large and small diameters. The reference numeral 25X represents a rail in the direction of the X-axis and 25Y a rail in the direction of the Y-axis. Sliders 26 and 27 are movably guided by the rails 25X and 25Y, respectively. The sliders 26 and 27 are moved by servomotors 28 and 29, respectively. Guide shafts 30 and 31 are attached to the sliders 26 and 27, respectively. A head base 32 is movably supported by the guide shafts 30 and 31. When the sliders 26 and 27 are advanced or withdrawn, the head base 32 is moved in the X-Y direction in correspondence with the movement of the sliders 26 and 27.

Light emitting heads 33 and 34 are attached to the head base 32. The light emitting head 33 emits a light flux 35 having a small diameter and is connected to a low power laser power source 37 (e.g., an He-Cd laser device) through an optical fiber 36 (e.g., a quartz fiber). The light emitting head 34 emits a light flux 38 having a large diameter and is connected to a high power laser power source 40 (e.g., an Ar laser or a condensing type mercury lamp) through an optical fiber 39.

When a cured object is produced by the above-described apparatus, the base 21 is first located slightly above the aperture 13 and the light flux 35 or 38 scans a horizontal section of the target object. The scanning operation is carried out by moving the X-Y table 17 controlled by the computer.

After the entire surface of that horizontal section (the portion corresponding to the bottom surface, in this case) of the target object has been irradiated with light, the base 21 is lifted at a predetermined pitch and an uncured photocurable resin is poured between the cured object 24 and the base 21, and light is radiated in the same way as above. By repeating this process, the cured object having the intended configuration is obtained.

Preferred examples of a method of radiating the light flux 35 having a small diameter and the light flux 38 having a large diameter will now be explained with reference to FIGS. 1 to 7.

Figure 1:
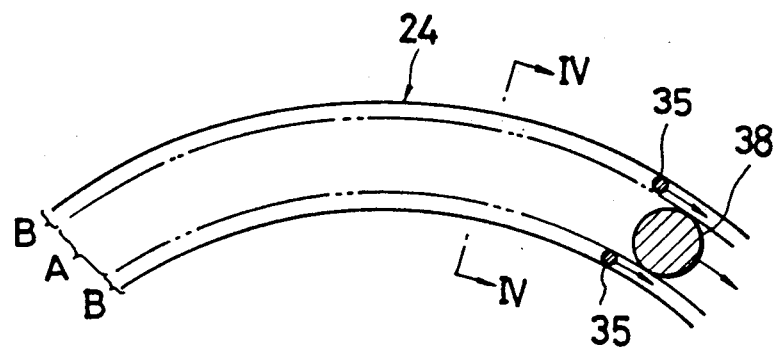
FIGS. 1, 2 and 3 are explanatory plan views of the scanning operation of a light flux.
Figure 4:
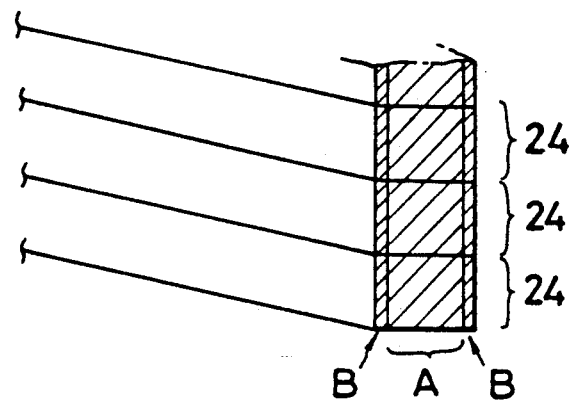
FIGS. 4, 5, 6 and 7 are explanatory sectional views of the scanning operation of a light flux.

In the method shown in FIG. 1, the cured portion A which constitutes a main part of the cured layer 24 is first formed by the scanning operation of the light flux 38 having a large diameter, and the cured portions B which constitutes the surface portions on both sides of the upper side and the under side of the cured portion A are next formed by the scanning operation of the light flux 35 having a small diameter. FIG. 4 is a sectional view of the cured portions shown in FIG. 1, taken along the line IV—IV, which shows the state in which the thus-formed cured layers 24 are laminated.

It is also possible in the method shown in FIG. 1 to first form the cured portions B by the scanning operation of the light flux 35 having a small diameter, and then form the cured portion A by the scanning operation of the light flux 38 having a large diameter.

Figure 2:
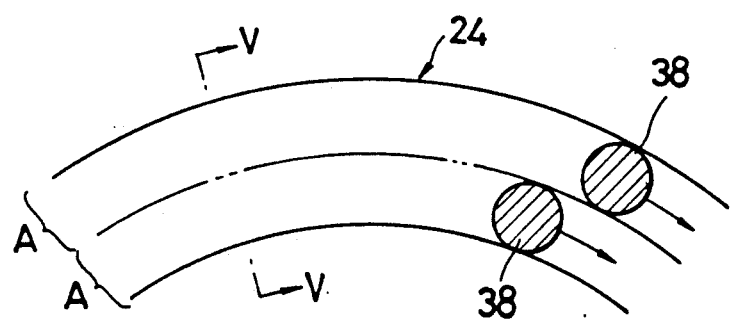
Figure 5:
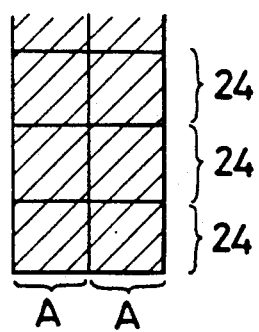

A method shown in FIG. 2 is a method of forming the cured layer 24 by providing the cured portions A parallel to each other by a plurality of (two, in this example) scanning operations of the light flux 38 having a large diameter. FIG. 5 is a sectional view of the cured portions shown in FIG. 2, taken along the line V—V, which shows the state in which the thus-formed cured layers 24 are laminated.

Figure 3:
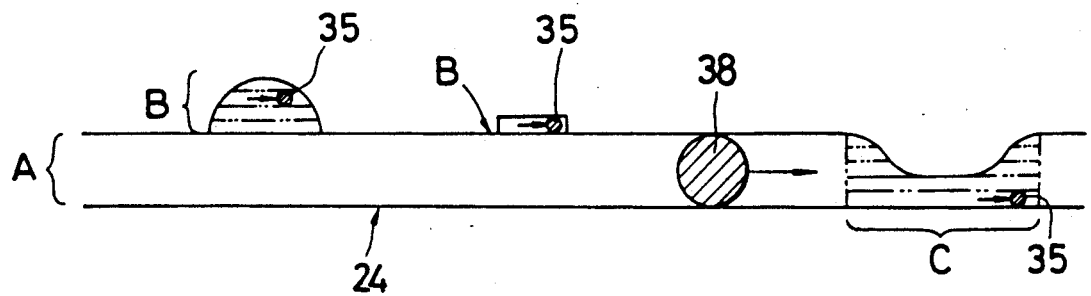

A method shown in FIG. 3 is a method of forming the main cured portion A by the scanning operation of the light flux 38 having a large diameter, then forming the ornamental cured portions B on the surface by the scanning operation of the light flux 35 having a small diameter, and attaching the cured portions B to the cured portion A. In this case, it is also possible to form the cured portions B first and then form the cured portion A.

If there is a thin portion C in the middle of the cured portion A, the cured portion C is first formed by the scanning operation of the light flux 35 having a small diameter.

Figure 6:
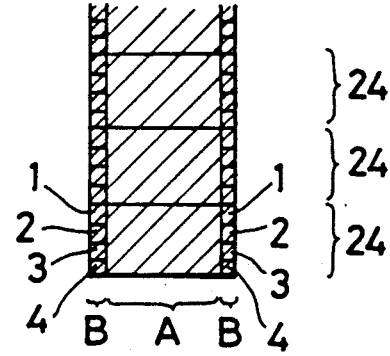

In a method shown in FIG. 6, a cured layer 1 is first formed by the scanning operation of the light flux 35 having a small diameter, and the base 21 is then lifted sequentially to have a distance corresponding to the thickness of the cured layer 1. Cured layers 2, 3 and 4 are sequentially formed by the scanning operation of the light flux 35 having a small diameter. The cured layer 24 is formed by forming the cured portions on both side surfaces and then forming the cured portion A by the radiation of the light flux 38 having a large diameter. The number of cured layers 1 to 4 is not restricted to four as shown in FIG. 6, but it may be any number if it is not less than two.

Figure 7:
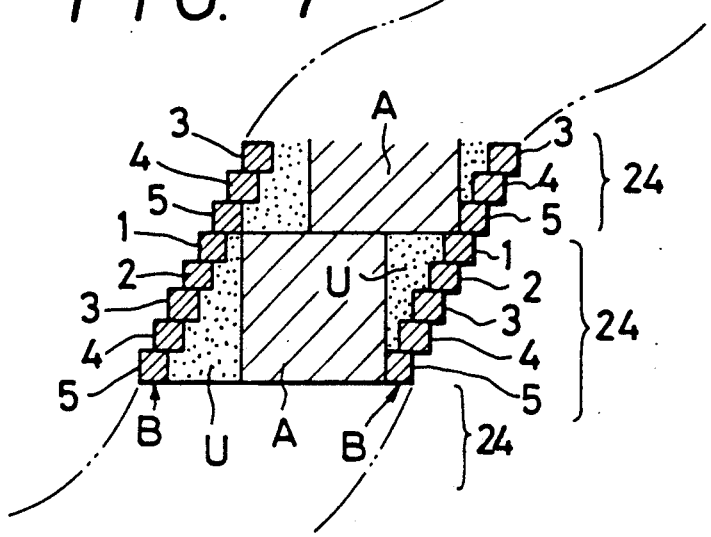

In a method shown in FIG. 7, the cured layers 1 to 5 are laminated in the same process such as that shown in FIG. 6 so as to form the cured portions B. The cured portion A is next formed by radiation the light flux 38 having a large diameter onto the portion sandwiched by the portions B. In this case, the laminate of the cured layers 24 constitutes an inclined surface or a curved surface with respect to the direction of lamination (vertical direction in FIG. 7). That is, the cured layers 1 to 5 are laminated at the respective positions slightly deviated from the precedent cured layers. A region U which is not irradiated with the light flux 38 having a large diameter exists between the portions A and B.

The un-irradiated portion is cured by radiating light from another light source (e.g., a mercury lamp) on the entire surface of the target object (after-treatment) after the outline of the target object is formed. If the region U is very small, such an after-treatment is dispensed with.

Figure 10:
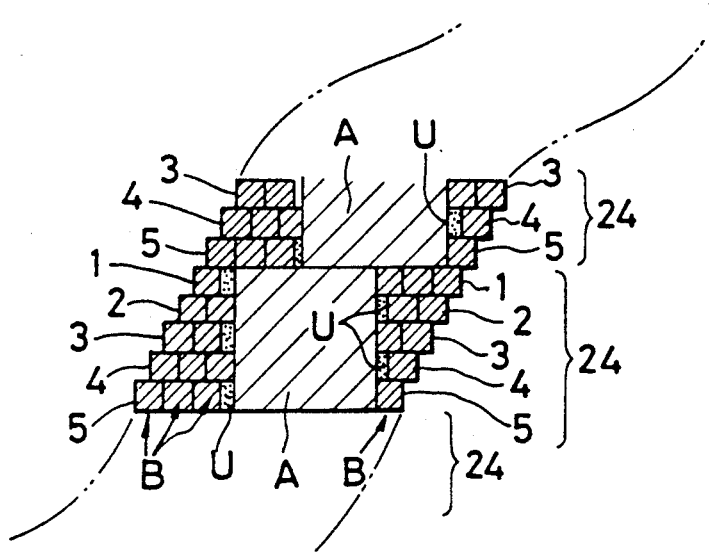
FIG. 10 is an explanatory sectional view of the scanning operation of a light flux.

A method shown in FIG. 10 is a method of forming a wide cured portion by a plurality of scanning operations of the light flux 35 having a small diameter in order to reduce the area of the un-irradiated region U shown in FIG. 7. By reducing the area or the un-irradiated region U, the after-treatment is dispensed with.

In the present invention, a light flux having a diameter of about 2 to 10 mm is preferable as the light flux having a large diameter. As the light flux having a small diameter, a light flux having a diameter of about 0.1 to 1 mm is preferable. As the light source for the light flux having a large diameter, an Ar laser or an inexpensive condensing type mercury lamp having an output of 100 to 5000 mW is preferable. As the light source for the light flux having a small diameter, an He-Cd laser having an output of 10 to 40 mW is preferable. An Ar laser having a low power is naturally usable.

The scanning operations of the light fluxes having a small diameter and a large diameter are preferably carried out by the operation of the X-Y table, but a mirror scan system (system for carrying out light flux scanning by the rotation of a mirror) may be adopted instead. However, if the target object is a large-sized one having a thickness of not less than 1 m, the X-Y table, which has good light flux scanning accuracy, is preferable.

In the above-described embodiments, the aperture 13 is provided on the bottom surface of the container 11 and light is radiated from below the container 11. Alternatively, the light emitting portion 15 may be disposed above the container 11 and the light flux may be radiated onto the liquid surface. In addition, the aperture 13 may be provided on a side surface of the container 11 and light is radiated from the side surface of the container 11. In this case, the base 21 is gradually moved sideways in the production process.

In the present invention, various resins which are cured by light irradiation are usable For example, polyurethane methacrylate, origo-ester acrylate, urethane acrylate, epoxy acrylate, photosensitive polyimide and aminoalkyd will be cited.

As the light, various kinds of lights such as visible light and ultraviolet light may be used in accordance with the photocurable resin used. The light may be used in the form of ordinary light, but if it is used as a laser beam, it is possible to enhance the energy level, shorten the molding time and enhance the molding accuracy by utilizing the good condensing property.

As described above, according to the method of the present invention, a plurality of light fluxes having large and small diameters are used, and even a large target object is produced in a short time. In addition, it is possible to finish the surface finely and at high accuracy by using a light flux having a small diameter.

According to the present invention, it is possible to use an inexpensive mercury light as a light source, which leads to reduction in the equipment cost and the cost of expendable supplies. Therefore, it is possible to produce an object with efficiency in accordance with the required accuracy.

According to the present invention, a light flux having a large diameter is used for the scanning operation, and the required number of data supplied for the scanning device is very small, so that the time and labor for the preparation of molding are greatly saved.

While there has been described what are at present considered to be preferred embodiments of the invention, it will be understood that various modifications may be made thereto, and it is intended that the appended claims cover all such modifications as fall within the true spirit and scope of the invention.

We claim:
1. An optical molding method for making a target object comprising the steps of:
  (a) radiating a light flux onto a photocurable fluid substance while moving said light flux to form and cure a layer of a target object;
  (b) then supplying a photocurable fluid substance on a side of the cured portion;
  (c) then radiating a light flux onto said supplied photocurable fluid substance while moving said light flux to form and cure another layer of said target object;
  (d) repeating steps (a)-(c) to successively laminate said layers and form said target object; the improvement comprising:
  providing at least one light flux having a large diameter light and at least one light flux having a small diameter; and
  radiating the large diameter light flux and the small diameter light flux onto the photocurable fluid substance to form and cure a target object, said target object having a main part, detailed portions and surface portions, wherein said large diameter light flux is radiated onto the photocurable substance to form and cure the main part and said small diameter light flux is radiated onto the photocurable substance to form and cure the detailed and surface portions so that said target object is formed and cured by combinations of the large diameter light flux and the small diameter light flux.

2. A method according to claim 1, wherein after said light flux having a large diameter is radiated so as to schematically cure said photocurable fluid substance at the main part of said target object, said light flux having a small diameter is radiated so as to cure a photocurable fluid substance at the detailed portions and the surface portions of said target object.

3. A method according to claim 1, wherein after said light flux having a small diameter is radiated so as to cure the photocurable fluid substance at the detailed portions and the surface portions of said target object, said light flux having a large diameter is radiated so as to schematically cure said photocurable fluid substance at the main part of said target object.

4. A method according to claim 1, wherein said light flux having a small diameter and said light flux having a large diameter are radiated at the same time so as to simultaneously cure the photocurable fluid substance at the detailed portions and the surface portion of said target object and the photocurable fluid substance at the main part of said target object.

5. A method according to claim 1, wherein said light flux having a small diameter and said light flux having a large diameter are alternately radiated so as to cure said photocurable fluid substance.

6. A method according to claim 1, wherein said light flux having a large diameter has a diameter of 2 to 10 mm.

7. A method according to claim 1, wherein said light flux having a small diameter has a diameter of 0.1 to 1 mm.

8. A method according to claim 6, wherein a light source for said light flux having a large diameter is either of an Ar laser or a condensing type mercury lamp having an output of 100 to 5000 mW.

9. A method according to claim 7, wherein a light source for said light flux having a small diameter is either of an He-Cd laser or an Ar laser having an output of 10 to 40 mW.

10. A method according to claim 1, wherein the scanning of said light flux having a small diameter and said light flux having a large diameter is carried out by operation of an X-Y table.

11. A method according to claim 1, wherein said photocurable fluid substance is one member selected from the group consisting of origo-ester acrylate, urethane acrylate, epoxy acrylate, photosensitive polyimide and aminoalkyd.

12. A method according to claim 1, wherein a light flux having a large diameter and a light flux having a small diameter are used as said light flux.

13. A method according to claim 1, wherein a light flux having a large diameter, a light flux having a medium diameter and a light flux having a small diameter are used as said light flux.

* * * * *